(12) United States Patent  
Amizur et al.

(10) Patent No.: US 9,404,997 B2  
(45) Date of Patent: Aug. 2, 2016

(54) COMMUNICATION STATION AND METHOD FOR TIME-OF-FLIGHT POSITIONING USING COOPERATING STATIONS

(71) Applicant: Intel Corporation, Santa Clara, CA (US)

(72) Inventors: Yuval Amizur, Kfar-Saba (IL); Leor Banin, Petach Tikva (IL); Uri Schatzberg, Kiryat Ono (IL); Alexander Sirotkin, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 479 days.

(21) Appl. No.: 13/790,432

(22) Filed: Mar. 8, 2013

(65) Prior Publication Data

US 2014/0253385 A1 Sep. 11, 2014

(51) Int. Cl.
*G01S 1/24* (2006.01)
*G01S 5/14* (2006.01)
*G01S 5/00* (2006.01)
(Continued)

(52) U.S. Cl.
CPC ............... *G01S 5/14* (2013.01); *G01S 5/0072* (2013.01); *G01S 13/765* (2013.01); *G01S 13/876* (2013.01)

(58) Field of Classification Search
CPC ........... G01S 1/24; G01S 5/14; G01S 5/0072; G01S 13/765; G01S 13/876; H04W 80/04; H04W 28/04
USPC ................................... 342/387; 370/328, 329
See application file for complete search history.

(56) References Cited

U.S. PATENT DOCUMENTS

2002/0184418 A1   12/2002  Blight
2004/0102198 A1    5/2004  Diener et al.
2010/0254308 A1*  10/2010  Laroia et al. .................. 370/328
(Continued)

FOREIGN PATENT DOCUMENTS

CN      201681155 U    12/2010
CN      101247627 B     5/2011
(Continued)

OTHER PUBLICATIONS

"International Application Serial No. PCT/US2014/019412, International Search Report mailed Apr. 29, 2014", 4 pgs.
(Continued)

*Primary Examiner* — Harry Liu
(74) *Attorney, Agent, or Firm* — Schwegman Lundberg & Woessner, P.A.

(57) ABSTRACT

Embodiments of a communication station and method for time-of-flight (ToF) positioning in a wireless network are generally described herein. In some embodiments, a ToF cooperation table may be received by a positioning station from an access point. The ToF cooperation table may identify one or more cooperating stations and may include information about each cooperating station for ToF positioning. A ToF positioning protocol may be performed with at least some of the cooperating stations identified in the ToF cooperation table using the information in the ToF cooperation table. During the ToF positioning protocol, a current position and a station positional accuracy may be received from each cooperating station. The current position may be a position when ToF is measured. A location of the positioning station may be determined based on the current positions and the ranges to each of the cooperating stations determined from the ToF positioning protocol.

20 Claims, 4 Drawing Sheets

(51) Int. Cl.
*G01S 13/76* (2006.01)
*G01S 13/87* (2006.01)

(56) References Cited

U.S. PATENT DOCUMENTS

| | | | | |
|---|---|---|---|---|
| 2010/0271263 | A1* | 10/2010 | Moshfeghi | 342/378 |
| 2012/0102106 | A1* | 4/2012 | Chen | 709/204 |
| 2012/0120892 | A1* | 5/2012 | Freda et al. | 370/329 |
| 2012/0172054 | A1 | 7/2012 | Waters et al. | |
| 2013/0176897 | A1* | 7/2013 | Wang et al. | 370/254 |
| 2014/0010150 | A1* | 1/2014 | Agarwal et al. | 370/328 |

FOREIGN PATENT DOCUMENTS

| | | |
|---|---|---|
| CN | 104995527 A | 10/2015 |
| KR | 1020120070172 A | 6/2012 |
| TW | 200946945 A | 11/2009 |
| TW | 201240497 A | 10/2012 |
| WO | WO-2012114304 A1 | 8/2012 |
| WO | WO-2014137807 A1 | 9/2014 |

OTHER PUBLICATIONS

"International Application Serial No. PCT/US2014/019412, Written Opinion mailed Apr. 29, 2014", 11 pgs.

"Part 11: Wireless LAN Medium Access Control (MAC) and Physical Layer (PHY) Specifications", IEEE 802.11-2012. IEEE Standard for Information technology. Telecommunications and information exchange between systems. Local and metropolitan area networks. IEEE Computer Society., (Mar. 29, 2012), 2793 pgs.

"Part 11: Wireless LAN Medium Access Control (MAC) and Physical Layer (PHY) Specifications, Amendment 5: Enhancements for Higher Throughput", IEEE 802.11n. Local and metropolitan area networks. IEEE Computer Society., (Oct. 29, 2009), 536 pgs.

"International Application Serial No. PCT/US2014/019412, International Preliminary Report on Patentability mailed Sep. 15, 2015", 13 pgs.

"Taiwanese Application Serial No. 103107872, Office Action mailed Apr. 20, 2015", W/ English Search Report, 12 pgs.

"Taiwanese Application Serial No. 103107872, Response filed Jul. 21, 2015 to Office Action mailed Apr. 20, 2015", W/ English Claims, 106 pgs.

\* cited by examiner

COMMUNICATION STATION AND METHOD FOR TIME-OF-FLIGHT POSITIONING USING COOPERATING STATIONS

TECHNICAL FIELD

Embodiments pertain to wireless networks. Some embodiments relate to wireless networks that operate in accordance with one of the IEEE 802.11 standards including the IEEE 802.11-2012 standards. Some embodiments relate to time-of-flight (ToF) positioning. Some embodiments relate to location determination. Some embodiments relate to indoor navigation.

BACKGROUND

Outdoor navigation and positioning has been widely deployed thanks to the development of various global navigation-satellite-systems (GNSS) as well as various cellular systems. Indoor navigation and positioning differs from the outdoor navigation and positioning since the indoor environment does not enable the reception of signals from satellites or cellular base stations as well as in the outdoor environment. As a result, accurate and real-time indoor navigation and positioning are difficult to achieve.

Thus there are general needs for improved navigation and positioning methods. There are also general needs for improved navigation and positioning methods suitable for indoor environments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
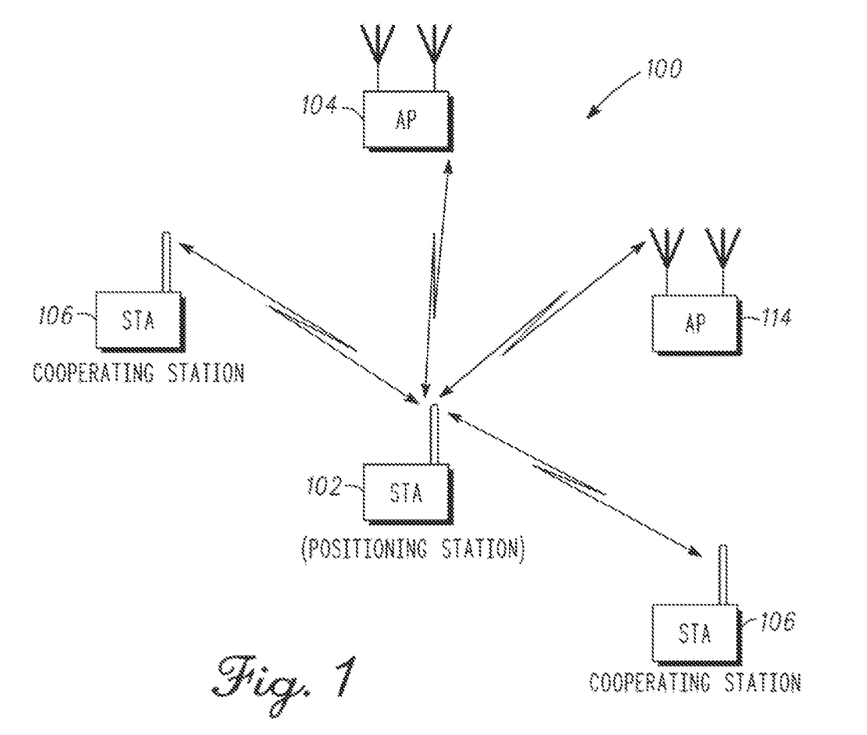
FIG. 1 illustrates various network elements of a wireless network in accordance with some embodiments.

FIG. 1 illustrates various network elements of a wireless network in accordance with some embodiments. Wireless network 100 includes a plurality of communication stations (STAs) and a plurality of access points (APs) which may communicate in accordance with IEEE 802.11 communication techniques. The communication stations may be mobile devices that are non-stationary and do not have fixed locations. The access points may be stationary and have fixed locations. The stations may include a positioning station 102 and one or more cooperating stations 106. The access points may include access point 104 and one or more other access points 114. The positioning station 102 may be a communication station that performs ToF positioning with one or more cooperating stations 106 and/or one or more access points 104 and/or 114 to determine its location.

In accordance with embodiments, the positioning station 102 may receive a ToF cooperation table from an access point, such as access point 104. The ToF cooperation table may identify one or more cooperating stations 106 and may include information about each cooperating station 106 for ToF positioning. The positioning station 102 may perform a ToF positioning protocol with at least one of the cooperating stations 106 identified in the ToF cooperation table using the information in the ToF cooperation table. During the ToF positioning protocol, the positioning station 102 may receive a current position and a station positional accuracy of each cooperating station 106. The current position may be the position of the cooperating station 106 at the moment when ToF is measured. In these embodiments, the location of the positioning station 102 may be determined from ranges to each of the one or more cooperating stations 106 determined from the ToF positioning protocol and from the current positions of the cooperating stations 106.

In some embodiments, ToF positioning may also be performed with one or more access points (e.g., using AP 104 and/or AP 114). In these embodiments, the information for ToF positioning may be provided by an access point in a neighbor list. These embodiments are described in more detail below.

Unlike some conventional systems, the ToF cooperation table may identify non-AP network elements such as mobile stations. This allows the positioning station 102 to use these additional network elements for ToF positioning providing increased coverage. This is particularly beneficial when there are an insufficient number of access points available for ToF positioning. In these embodiments, the cooperating stations 106 may act like access points for the purposes of ToF positioning.

In some embodiments, the positioning station 102 may determine its location relative to one or more cooperating stations and/or one or more access points. In other embodiments, the positioning station 102 may determine its location in geo-coordinates.

One advantage to some of the embodiments disclosed herein is that ToF positioning may be performed using the information provided to the positioning station 102 by a single access point 104. Accordingly, information for ToF positioning does not need to be requested from each cooperating station 106 and from each access point that is participating in ToF positioning. Improved indoor navigation and positioning may also be achieved. In these embodiments, each access point and each cooperating station involved in ToF positioning may perform ToF positioning with the positioning station to determine the range.

Figure 2:
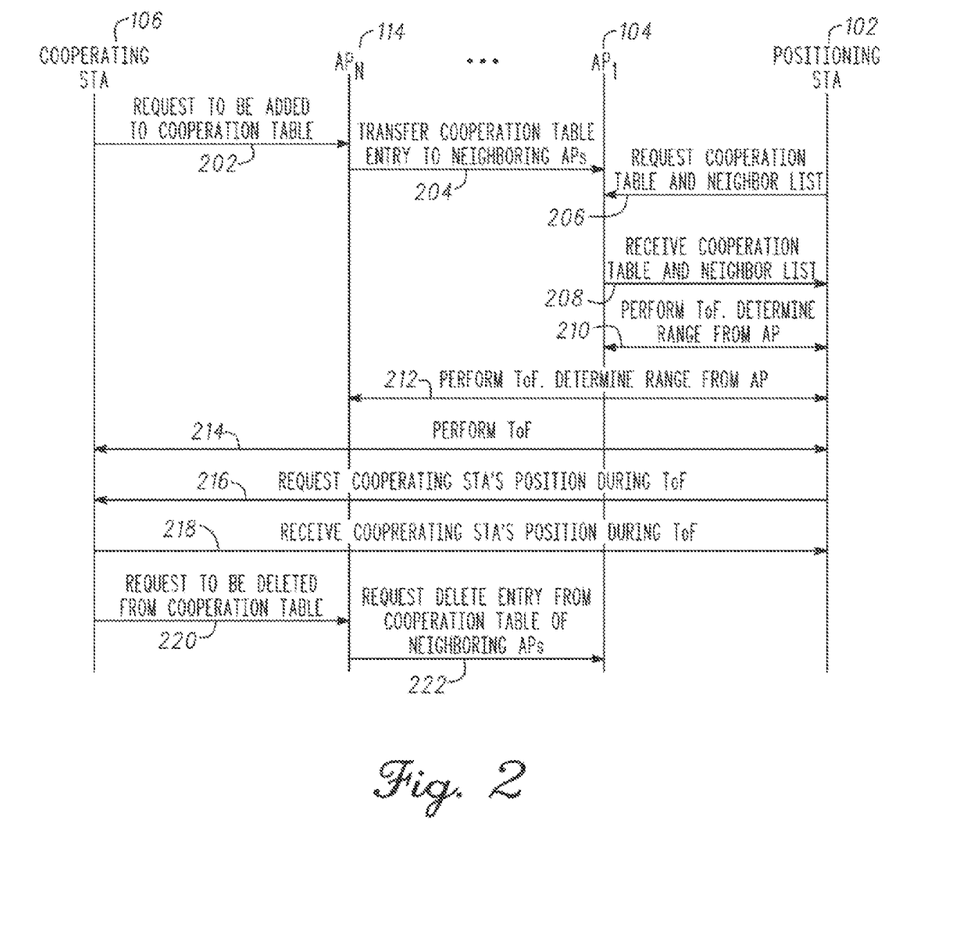
FIG. 2 illustrates a procedure for time-of-flight (ToF) positioning in accordance with some embodiments.

FIG. 2 illustrates a procedure for time-of-flight (ToF) positioning in accordance with some embodiments. In operation 202, a cooperating station 106 that wishes to cooperate in ToF positioning may send a station ToF cooperation begin message (e.g., STA_TOF_COOPERATION_BEGIN) to an access point 114 indicating that the station 106 will cooperate in ToF positioning operations. The station ToF cooperation begin message may include information for ToF positioning. The access point 114 may add an entry for the cooperating station 106 to a ToF cooperation table that may be stored by the access point 114. In operation 204, the access point 114 may notify any neighboring access points (e.g., access point 104) of the added entry to the ToF cooperation table. In some embodiments, the new table entry may be transferred to neighboring access points. In some embodiments, the communications between access points 104 and 114 may take place over a managed network, over the Internet, or in accordance with a Wi-Fi technique, although other ways of communication between access points may also be utilized.

In operation 206, the positioning station 102 may send a station cooperation table request message (e.g., STA_COOPERATION_TABLE_REQ) to the access point 104. The request message may request the ToF cooperation table from the access point 104. In operation 208, the positioning station 102 may receive an access point cooperation table response message (e.g., AP_COOPERATION_TABLE_RES) from the access point 104. The response message 208 may include the ToF cooperation table.

In operations 210 and 212, the positioning station 102 may perform a ToF positioning protocol with the access point 104 and any other access points (e.g., AP 114) to determine the range to the access point 104 and the other access points. As discussed in more detail below, access point information for ToF positioning may be received as part of a neighbor list.

In operation 214, the positioning station 102 may perform a ToF positioning protocol with at least one of the cooperating stations 106 identified in the ToF cooperation table using the information in the ToF cooperation table. During the ToF positioning protocol, the positioning station 102 may receive a current position and a station positional accuracy of each cooperating station 106 in operation 216. The current position of the cooperating station 106 may be the position at the moment when ToF is measured. The range to the cooperating station 106 may be determined by the positioning station 102 using the current position of the cooperating station 106.

In some embodiments, the positioning station 102 may only perform ToF positioning stations with non-AP cooperating stations, while in other embodiments, the positioning station 102 may perform ToF positioning stations with both non-AP cooperating stations and access points.

In some embodiments, during the ToF positioning protocol for each cooperating station 106, the positioning station 102 may send in operation 216 a station current position request message (e.g., STA_CURRENT_POSITION_REQ) directly to a cooperating station 106 requesting the current position of the cooperating station 106 when the ToF is measured. The positioning station 102 may receive a station current position response message in operation 218 (e.g., STA_CURRENT_POSITION_RES) directly from the cooperating station 106. The station current position response message may include the current position of the cooperating station 106 and the station-position accuracy for the current position.

In these embodiments, the current position at the moment ToF is measured may be determined during the ToF positioning protocol described in more detail below. The current position of the cooperating station 106 may be determined by the cooperating station 106 using a GPS-type positioning technique, a cellular positioning technique, a ToF positioning technique or other positioning technique.

In some embodiments, when a cooperating station 106 wishes to end its willingness to cooperate in ToF operations, the cooperating station 106 may send (in operation 220) a station ToF cooperation end message (e.g., STA_TOF_COOPERATION_END) to the access point 114 that it is currently associated with. The access point may then remove the cooperating station 106 from its ToF cooperation table. The access point 114 may send a request (in operation 222) to other access points (e.g., access point 104) requesting that the entry (for the station that no longer wishes to cooperate) be removed from the cooperation table. Cooperating stations 106 may also be removed from a ToF cooperation table when no longer associated with an access point.

In some embodiments, the positioning station 102 may send the station current position request message in operation 216 directly to the cooperating station 106 and may receive the station current position response message in operation 218 directly from the cooperating station 106 using a direct-link setup (DLS) protocol or a tunneled DLS (TDLS) protocol. In some embodiments, the DLS protocol or the TDLS protocol may be used by the positioning station 102 and the cooperating station 106 for communicating directly with each other without the use of an access point, although the scope of the embodiment is not limited in this respect.

In some alternate embodiments, the positioning station 102 may send a neighbor report request message to the access point 104 (e.g., instead of the station cooperation table request message in operation 206). The neighbor report request message may request at least some information from a ToF cooperation table from the access point 104. The positioning station 102 may receive a neighbor report response message from the access point 104 (e.g., instead of the access point cooperation table response message in operation 208). The neighbor report response message may include at least some of the information of the ToF cooperation table. During the ToF positioning protocol for each cooperating station 106, the positioning station may send a location request message (e.g., instead of the station current position request message in operation 216) directly to a cooperating station 106 requesting the current position of the cooperating station 106 when the ToF is measured, and the positioning station 102 may receive a location response message (e.g., instead of the station current position response message in operation 218) directly from the cooperating station 106. The location response message may include the current position of the cooperating station 106 and the station-position accuracy for the current position. In these alternate embodiments, the neighbor report request message, the neighbor report response message, the location request message and the location response message may be in accordance with the IEEE 802.11-2012 specifications, although this is not a requirement. In these alternate embodiments, the neighbor report request and response messages may be enhanced to convey the information of a ToF cooperation table.

In some embodiments, the information for performing the ToF positioning protocol included in a ToF cooperation table comprises at least a station frequency and a station address for each cooperating station 106. The positioning station 102 may use the station frequency and station address to send the station current position request message directly to a cooperating station 106. In these embodiments, the station frequency may be the frequency band or channel that is being used by the station. The station address may be an IP address of the station.

In some embodiments, the information in the ToF cooperation table may also include, for each cooperating station 106, one or more of a station position, a station-position accuracy, a station position source, a time passed since a station position update, a distance between the cooperating station and the access point 104, and a station timing offset calibration accuracy. In some embodiments, the positioning station 102 may select which of the cooperating stations 106 identified in the ToF cooperation table to use for the ToF positioning protocol based on the information in the ToF cooperation table. Cooperating stations 106 that are closer, have a greater positional accuracy, or have less time passed since a station position update may be selected over cooperating stations 106 that are further away, have a lower positional accuracy and have greater time passed since a station position update. The station timing offset calibration accuracy may, for example, be used to determine the accuracy of the ToF determined in the ToF protocol.

In accordance with embodiments, each cooperating station 106 that is identified in the ToF cooperation table may be a station in the vicinity of an access point (i.e., either access point 104 or access point 114) that has indicated ToF support capability and has indicated its willingness to cooperate in ToF operations by providing information for the ToF cooperation table to an access point. In these embodiments, the access points 104 and 114 may be configured to share this information with neighboring access points so that neighboring access points may maintain updated ToF cooperation tables. Stations in the vicinity of an access point may comprise stations that are close enough to communicate with the access point 104 in accordance with IEEE 802.11 communication techniques.

In some alternate embodiments, the ToF cooperation table may be received from the access point 104 in a beacon frame (i.e., rather than in an AP cooperation table response message 208). These embodiments are described in more detail below.

In some embodiments, the cooperating stations 106 identified in a ToF cooperation table may be mobile stations having non-fixed locations. In these embodiments, the positioning station 102 may receive a neighbor list from the access point 104 as part of operation 208. The neighbor list may identify one or more access points (such as access points 104 and 114). The access points may be stationary and have fixed locations. The neighbor list may include information for ToF positioning including at least a current position for each of the identified access points. For the access points identified in the neighbor list, the positioning station 102 may perform a ToF positioning protocol with at least some of the access points using the information in the neighbor list to determine a range to each of the access points. In these embodiments, the positioning station 102 may refrain from requesting a current position of each access points during the ToF positioning since the position of the access points may already be known. The location of the positioning station 102 may be determined based on the ranges to each of the cooperating stations 106 and ranges to each of the access points determined from the ToF positioning protocols.

In some of these embodiments, the access points may be logged into a neighbor list while non-AP stations willing to cooperate in ToF positioning may be logged into a ToF cooperation table. In some embodiments, access points may also be included in the ToF cooperation table. In some alternate embodiments in which ToF cooperation tables are not used, access points and stations willing to cooperate in ToF positioning may be logged into the neighbor list. In some embodiments, the neighbor list may be a neighbor report and may include information about neighbor access points for use by a station as roaming candidates.

In these embodiments, there is no requirement that the access points utilize synchronized clocks. The ToF positioning protocol performed with an access point may include using an access point position and an access point position accuracy stored in a neighbor list to determine a range to each of the access points. Since the location of the access points is fixed, the access point position information (i.e., the current position) stored in the neighbor list may be used and an updated current position does not need to be requested and determined at the moment the ToF is measured, as is the case with cooperating stations 106.

In some embodiments, the request message sent in operation 206 may include a request for both the ToF cooperation table and the neighbor list. The response message received in operation 208 may include both the ToF cooperation table and the neighbor list. In some embodiments, the access point 104 may provide information for ToF positioning rather than the actual ToF cooperation table and/or the actual neighbor list.

In some embodiments, for each access point listed on a neighbor list, the neighbor list may include one or more of the following fields for ToF positioning: an access point position, access point position accuracy, access point position source, access point type, time passed since last access point position update, distance from the access point, and AP timing offset calibration accuracy. In some embodiments, the access point type may identify whether the access point is stationary, moving, dedicated to ToF positioning, or a non-AP (e.g., a client device). In some embodiments, this information may be included as part of neighbor report request or response frame.

In some embodiments, this information may be included in a new information element (IE). In some embodiments, this information may be included as part of a neighbor report element. In some embodiments, this information may be added to a basic service set identification (BSSID) information field of the neighbor report element. In these embodiments, a neighbor report request frame may be enhanced to allow a positioning station 102 to indicate that it is requesting information for ToF positioning.

The neighbor report element may include an element ID field that may equal the neighbor report value and a Length field in octets that is variable and depends on the number and length of optional sub-elements. Each report element may describe an AP and may include the BSSID, BSSID Information, the channel number, an operating class, physical (PHY) type, and optionally may include sub-elements. The BSSID may be the BSSID of the basic service set (BSS) that is being reported and the subsequent fields in the neighbor report element may pertain to the BSS. The BSSID Information field may be used to help determine neighbor service set transition candidates.

The inclusion of additional fields that include information for ToF positioning in a neighbor list may allow a positioning station 102 to scan for a single access point for requesting and receiving the information needed for ToF positioning. In this way, the positioning station 102 need not scan all frequency bands or channels and can decide which access points to use for ToF positioning based on the neighbor list.

Figure 3:
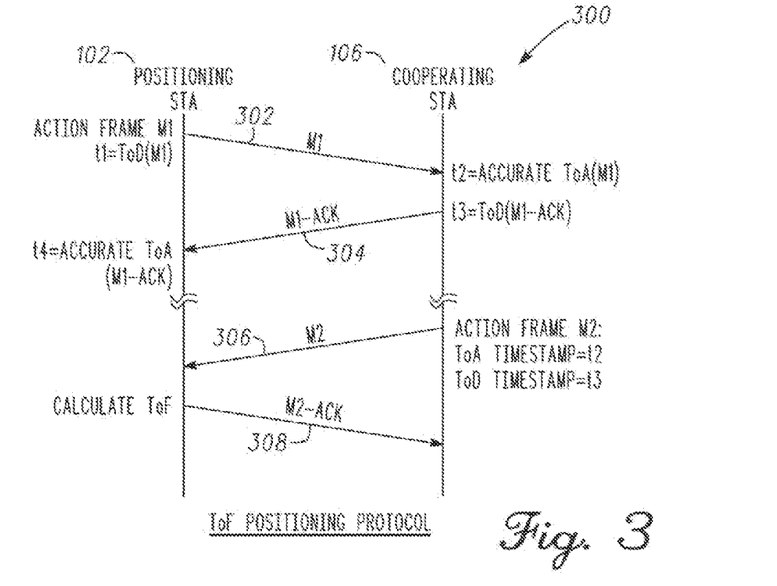
FIG. 3 illustrates a ToF positioning protocol in accordance with some embodiments.

FIG. 3 illustrates a ToF positioning protocol in accordance with some embodiments. The ToF positioning protocol 300 includes exchanging action frames with time stamps and time-of-departure (ToD) information to determine the ranges to each of the cooperating stations 106. The ToF positioning protocol 300 may be performed by a positioning station 102 and a non-AP such as a cooperating station 106. The ToF positioning protocol 300 may also be performed by a positioning station 102 and an AP, such as AP 104 or AP 114.

In some embodiments, the action frames exchanged between the positioning station 102 and the cooperating station 106 may include action frame M1 302, action frame M1-ACK 304, action frame M2 306, and action frame M2-ACK 308. In these embodiments, action frame M1 302 may be transmitted by the positioning station 102 at ToD t1 and may be received at the cooperating station 106 at time-of-arrival (ToA) t2. Action frame M1-ACK 304 may be transmitted at the cooperating station 106 at ToD t3 and received at the positioning station at ToA t4.

Action frame M2 306 may include position information (i.e., the current position) for the cooperating station 106 as well as ToA t2 and ToD t3. After receipt of action frame M2 306, the positioning station 102 may estimate the average time-of-flight (ToF) between the positioning station 102 and the cooperating station 106 using ToD t1, ToA t2, ToD t3 and ToA t4. In some embodiments, the following equation may be used to determine the ToF: ToF=[(t4-t1)−(t3-t2)]/2. The range to the cooperating station 106 may be determined by multiplying the ToF by the speed of light. The ranges to three or more cooperating stations 106 and access points may be used to determine the location of the positioning station 102 based on trilateration, although this is not a requirement.

Figure 4:
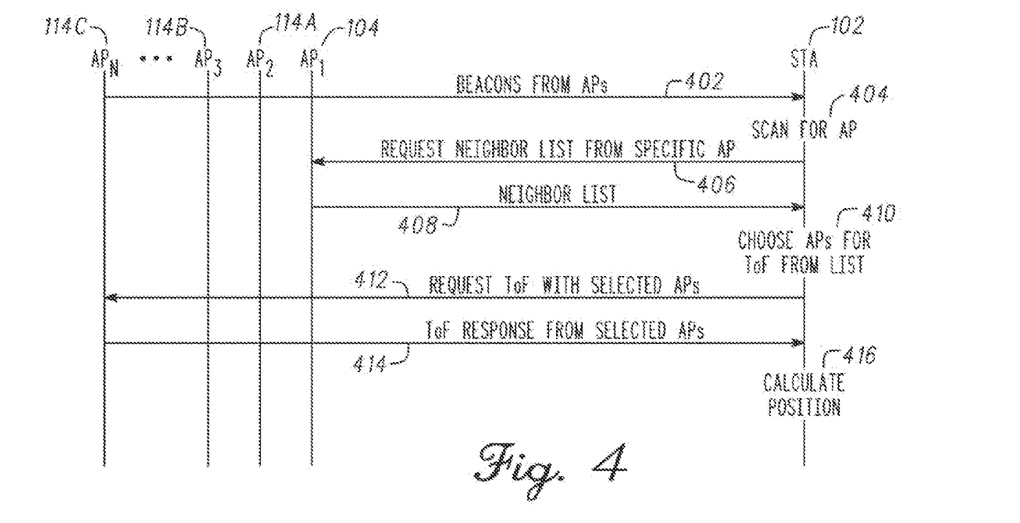
FIG. 4 illustrates a procedure for ToF positioning in accordance with some other embodiments.

FIG. 4 illustrates a procedure for ToF positioning in accordance with some embodiments. In operation 402, beacons may be transmitted from a plurality of access points (e.g., $AP_1$ 104, $AP_2$ 114A, $AP_3$ 114B . . . $AP_N$ 114C etc.). In operation 404, the positioning station 102 may scan to identify and select a single access point (e.g., AP 104) and may transmit a request for the neighbor list from the selected AP 104 in operation 406. The scan may be an active or a passive scan. In these embodiments, the positioning station 102 and the access point 104 may be in an associated state. In operation 408, the neighbor list may be received from the selected access point 104. As discussed above, the neighbor list may identify several access points and may include ToF positioning information for the several access points. In operation 410, the positioning station 102 may select access points from the neighbor list for performing ToF positioning. In operation 412, the positioning station 102 may request ToF positioning with each of the selected access points using the information in the neighbor list. After ToF positioning is performed, in operation 414 the positioning station 102 may receive a ToF positioning response from each of the selected access points (e.g., APs 104, 114A, 114B, and 114C). In some embodiments, the ToF positioning protocol 300 (FIG. 3) may be used. In operation 416, the positioning station may determine its location based on ranges to the selected access points. In some embodiments, operation 412 may include transmitting action frame 302 (FIG. 3) and operation 414 may include receiving action frame 304 (FIG. 3) and action frame 306 (FIG. 3).

In some of these embodiments, ToF positioning may also be performed with one or more cooperating stations 106 as discussed above. In these embodiments, the positioning station 102 may determine its location based on ranges to the selected access points as well as ranges to one or more cooperating stations 106.

Figure 5:
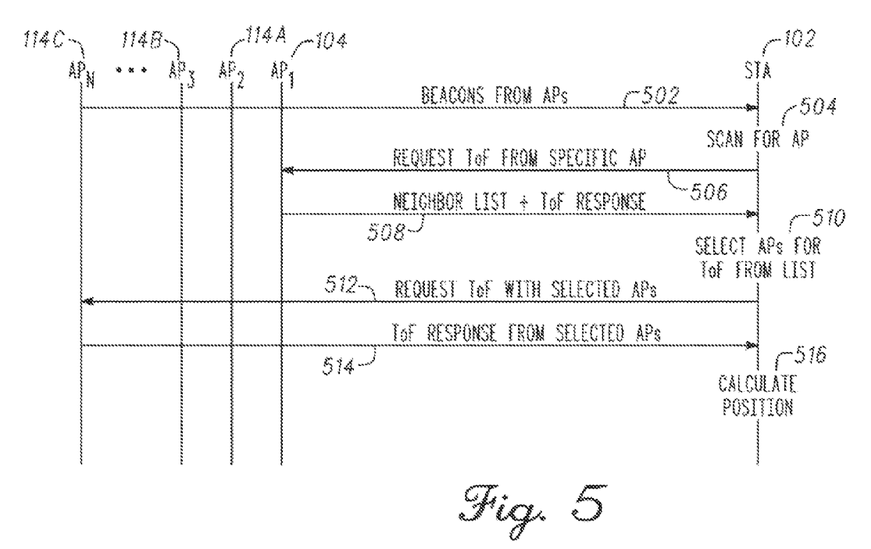
FIG. 5 illustrates a procedure for ToF positioning in accordance with some other embodiments.

FIG. 5 illustrates a procedure for ToF positioning in accordance with some other embodiments. In operation 502, beacons may be received from a plurality of access points (e.g., $AP_1$ 104 . . . $AP_N$ 114C etc.). In operation 504, the positioning station 102 may scan to identify and select a single access point (e.g., AP 104). In operation 506, the positioning station 102 and may transmit a ToF request to the selected access point 104. In operation 508, the positioning station 102 may receive a ToF response from the selected access point 104. The ToF response may include a neighbor list that includes ToF positioning information for access points identified on the neighbor list. In these embodiments, the ToF positioning request may include a request for the neighbor list, although this is not a requirement as the selected access point 104 may be configured to include the neighbor list in the ToF response. In these embodiments, the positioning station 102 and the access point 104 may be in an unassociated state. As discussed above, the neighbor list may identify several access points and may include information for ToF positioning for the several access points. In operation 510, the positioning station 102 may select access points from the neighbor list for performing ToF positioning. In operation 512, the positioning station 102 may request the performance of ToF positioning with each of the selected access points using the information in the neighbor list. After ToF positioning is performed, in operation 514 the positioning station 102 may receive a ToF positioning response from each of the selected access points. In some embodiments, the ToF positioning protocol 300 (FIG. 3) may be used. In operation 516, the positioning station 102 may determine its location based on ranges to the selected access points including based on the range to access point 104 determined from ToF positioning response received in operation 508. In these embodiments, the neighbor list may include the information discussed above, which may be included in an IE or a neighbor report element as discussed above. In some embodiments, operation 512 may include transmitting action frame 302 (FIG. 3) and operation 514 may include receiving action frame 304 (FIG. 3) and action frame 306 (FIG. 3).

In some of these embodiments, ToF positioning may also be performed with one or more cooperating stations 106 as discussed above. In these embodiments, the positioning station 102 may determine its location based on ranges to the selected access points as well as ranges to one or more cooperating stations 106.

Figure 6:
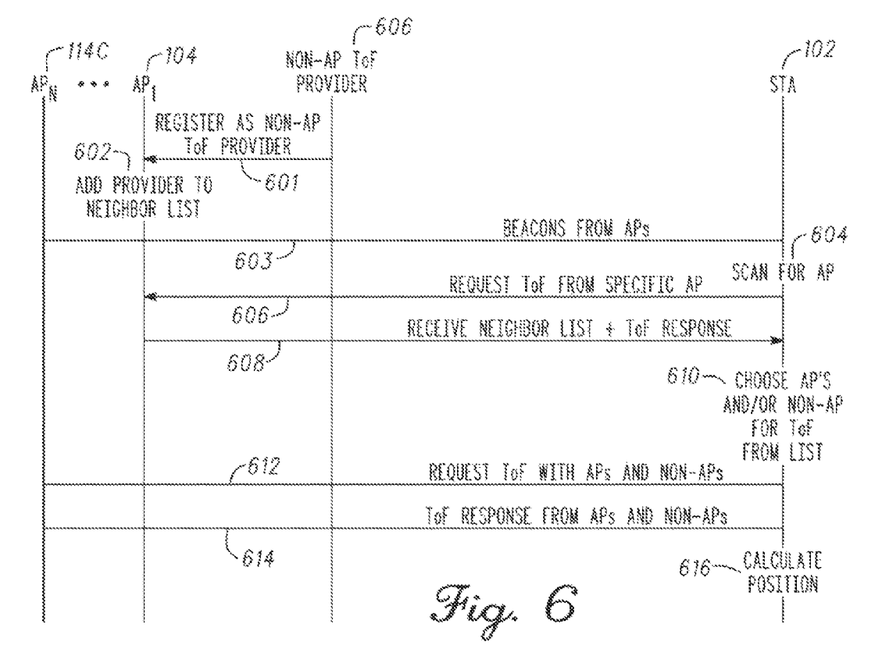
FIG. 6 illustrates a procedure for ToF positioning in accordance with some other embodiments.

FIG. 6 illustrates a procedure for ToF positioning in accordance with some other embodiments. In these embodiments, a non-AP 606, such a cooperating station 106 (FIG. 1), may register as a non-AP ToF provider in operation 601. In some embodiments, the non-AP 606 may send a request to be added to the cooperation table of an access point, such as access point 104. The access point 104 may add the non-AP 606 to its ToF cooperation table in operation 602. In these embodiments, the non-AP 606 may notify the access point 104 that it supports ToF functionality, and the access point 104 may indicate in the neighbor list with the Type field that the network element is a non-AP for ToF only.

In operation 603, beacons may be transmitted from a plurality of access points (e.g., $AP_1$ 104 . . . $AP_N$ 114C etc.). In operation 604, the positioning station 102 may scan to identify and select a single access point (e.g., access point 104). In operation 606, the positioning station 102 and may transmit a ToF request to the selected access point 104. In operation 608, the positioning station 102 may receive a ToF response from the selected access point 104. The ToF response may include the neighbor list that includes ToF positioning information for access points (e.g., AP 114A) and the non-AP 606 identified on the neighbor list. In these embodiments, the ToF positioning request may include a request for the neighbor list, although this is not a requirement as the selected access point 104 may be configured to include the neighbor list in the ToF response. In these embodiments, the neighbor list may identify several access points and several non-APs and may include information for ToF positioning for the several access points and several non-APs. In operation 610, the positioning station 102 may select access points and non-APs from the neighbor list for performing ToF positioning. In operation 612, the positioning station 102 may request the performance of ToF positioning with each of the selected access points and each of the selected non-APs using the information in the neighbor list. It is noted that there is no requirement for the positioning station 102 to utilize any access points for ToF positioning and that in some situations; only non-APs may be used.

After ToF positioning is performed, in operation 614 the positioning station 102 may receive a ToF positioning response from each of the selected access points as well as selected non-APs (e.g., non-AP 606). In some embodiments, the ToF positioning protocol 300 (FIG. 3) may be used. In operation 616, the positioning station 102 may determine its location based on ranges to the selected access points and selected non-APs from which a ToF response was received (including based on the range to access point 104 determined from ToF positioning response received in operation 608). In these embodiments, the neighbor list may include the information discussed above, which may be included in an IE or the neighbor report element as discussed above. In some embodiments, operation 612 may include transmitting action frame 302 (FIG. 3) and operation 614 may include receiving action frame 304 (FIG. 3) and action frame 306 (FIG. 3).

Figure 7:
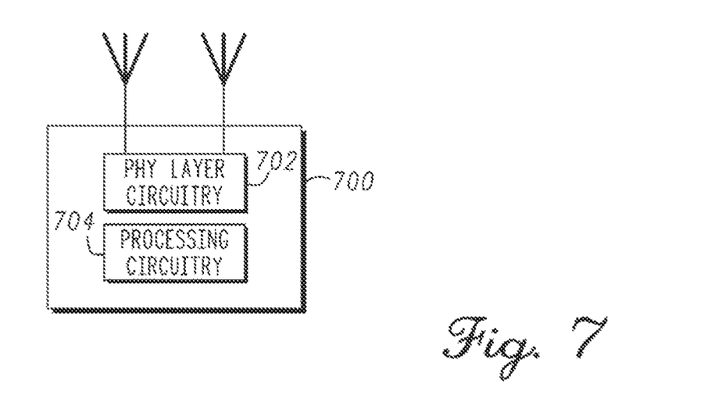
FIG. 7 is a functional diagram of a communication station in accordance with some embodiments.

FIG. 7 is a functional diagram of a communication station in accordance with some embodiments. Communication station 700 may be suitable for use as positioning station 102 (FIG. 1) or any of cooperating stations 106 (FIG. 1), although other configurations may also be suitable. Communication station 700 may also be suitable for use as an access point.

Communication station 700 may include physical-layer (PHY) circuitry 702 to communicate wirelessly with access points and other communication stations. Communication station 700 may also include processing circuitry 704 to perform other operations described herein. In accordance with embodiments, the physical layer circuitry 702 may be arranged to receive a ToF cooperation table from an access point and the processing circuitry 704 may be arranged to perform a ToF positioning protocol with at least one of the cooperating stations identified in the ToF cooperation table using the information in the ToF cooperation table. During the ToF positioning protocol, the physical layer circuitry 702 may be arranged to receive a current position and a station positional accuracy of each cooperating station, and the processing circuitry is arranged to determine a location of the station 700 based on ranges to each of the one or more cooperating stations determined from the ToF positioning protocol.

Although communication station 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of communication station 700 may refer to one or more processes operating on one or more processing elements.

In some embodiments, communication station 700, may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, a communication station may include one or more of a keyboard, a display, a non-volatile memory port, multiple antennas, a graphics processor, an application processor, speakers, and other mobile device elements. The display may be an LCD screen including a touch screen.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

In some examples, a method performed by a positioning station for time-of-flight (ToF) positioning, the method comprising: receiving a ToF cooperation table from an access point, the ToF cooperation table identifying one or more cooperating stations and includes information about each cooperating station for ToF positioning; performing a ToF positioning protocol with at least one of the cooperating stations identified in the ToF cooperation table using the information in the ToF cooperation table, wherein during the ToF positioning protocol, a current position and a station positional accuracy of the cooperating stations are received, the current position being a position when ToF is measured; and determining a location of the positioning station based on the current positions and ranges to the cooperating stations determined during the ToF positioning protocol.

In another example, the method further comprises: sending a station cooperation table request message to the access point, the request message requesting the ToF cooperation table from the access point; receiving an access point cooperation table response message from the access point, the response message including the ToF cooperation table, and wherein during the ToF positioning protocol for each cooperating station, the method includes: sending a station current position request message directly to a cooperating station requesting the current position of the cooperating station when the ToF is measured; and receiving a station current position response message directly from the cooperating station, the response message including the current position of the cooperating station and the station-position accuracy for the current position.

In another example, sending the station current position request message directly to the cooperating station and receiving the station current position response message directly from the cooperating station comprise using a direct-link setup (DLS) protocol or a tunneled DLS (TDLS) protocol.

In another example, the method comprises: sending a neighbor report request message to the access point, the neighbor report request message requesting at least some information from a ToF cooperation table from the access point; and receiving a neighbor report response message from the access point, the neighbor report response message including at least some of the information of the ToF cooperation table, and wherein during the ToF positioning protocol for each cooperating station, the method includes: sending a location request message directly to the cooperating station requesting the current position of the cooperating station when the ToF is measured; and receiving a location response message directly from the cooperating station, the location response message including the current position of the cooperating station and the station-position accuracy for the current position.

In another example, the information about each cooperating station included in the ToF cooperation table comprises at least a station frequency and a station address, wherein the positioning station is to use the station frequency and station address to send the station current position request message directly to the cooperating station.

In another example, the information in the ToF cooperation table further includes, for each cooperating station, one or more of a station position, a station-position accuracy, a station position source, a time passed since a station position update, a distance between the cooperating station and the access point, and a station timing offset calibration accuracy.

In another example, the method may comprise selecting the cooperating stations identified in the ToF cooperation table to use for the ToF positioning protocol based on the information in the ToF cooperation table, wherein cooperating stations that are closer, have a greater positional accuracy and have less time passed since the station position update are selected over cooperating stations that are further away, have a lower positional accuracy and have greater time passed since the station position update.

In another example, the method further comprises sending a station ToF cooperation begin message to the access point indicating that the station will cooperate in ToF operations, the station ToF cooperation begin message including the information for ToF positioning.

In another example, the ToF cooperation table is received from the access point in a beacon frame.

In another example, performing the ToF positioning protocol includes exchanging action frames with time stamps and time-of-departure (TOD) information to determine the ranges to each of the cooperating stations.

In another example, the cooperating stations identified in the ToF cooperation table are mobile stations having non-fixed locations, and wherein the method further includes receiving a neighbor list from the access point, the neighbor list identifying one or more access points, the access points being stationary and having fixed locations, the neighbor list including information for ToF positioning including at least a current position for each of the identified access points, wherein for the access points identified in the neighbor list, the method includes: performing a ToF positioning protocol with at least one of the access points using the information in the neighbor list to determine a range to each of the access points; and refraining from requesting a current position of the access points during the ToF positioning, wherein the location of the positioning station is determined based on the current positions and the ranges to each of the cooperating stations and the current positions and ranges to each of the access points determined from the ToF positioning protocols.

In another example, receiving the neighbor list from the access point, the neighbor list identifying one or more access points comprises receiving a Neighbor Report Element that includes information for ToF positioning.

In some examples, a wireless communication station is arranged to operate as a positioning station for time-of-flight (ToF) positioning. The station is arranged to: receive a ToF cooperation table from an access point, the ToF cooperation table identifying one or more cooperating stations and includes information about each cooperating station for ToF positioning; and perform a ToF positioning protocol with at least one of the cooperating stations identified in the ToF cooperation table using the information in the ToF cooperation table, wherein during the ToF positioning protocol the positioning station is arranged to: receive a current position and a station positional accuracy of the cooperating stations, the current position being a position when ToF is measured, and determine a location of the positioning station based on the current positions and ranges to the cooperating stations determined from the ToF positioning protocol.

In another example, the station may send a station cooperation table request message to the access point, the request message requesting the ToF cooperation table from the access point; and receive an access point cooperation table response message from the access point, the response message including the ToF cooperation table, and wherein during the ToF positioning protocol for each cooperating station, the positioning station is arranged to: send a station current position request message directly to a cooperating station requesting the current position of the cooperating station when the ToF is measured; and receive a station current position response message directly from the cooperating station, the response message including the current position of the cooperating station and the station-position accuracy for the current position.

In another example, the information about each cooperating station included in the ToF cooperation table comprises at least a station frequency and a station address, wherein the positioning station is to use the station frequency and station address to send the station current position request message directly to the cooperating station.

In another example, the cooperating stations identified in the ToF cooperation table are mobile stations having non-fixed locations, and wherein the positioning station is further arranged to: receive a neighbor list from the access point, the neighbor list identifying one or more access points, the access points being stationary and having fixed locations, the neighbor list including information for ToF positioning including at least a current position for each of the identified access points, wherein for the access points identified in the neighbor list, the positioning station is further arranged to: perform a ToF positioning protocol with at least one of the access points using the information in the neighbor list to determine a range to each of the access points; and refrain from requesting a current position of the access points during the ToF positioning, wherein the location of the positioning station is determined based on the current positions and the ranges to each of the cooperating stations and the current positions and ranges to each of the access points determined from the ToF positioning protocols.

In some other examples, a wireless communication station is arranged to operate as a positioning station for time-of-flight (ToF) positioning. The station comprises: one or more antennas; physical layer circuitry coupled to the one or more antennas to receive a ToF cooperation table from an access point, the ToF cooperation table identifying one or more cooperating stations and includes information about each cooperating station for ToF positioning; and processing circuitry to perform a ToF positioning protocol with at least one of the cooperating stations identified in the ToF cooperation table using the information in the ToF cooperation table, wherein during the ToF positioning protocol: the physical layer circuitry is arranged to receive a current position and a station positional accuracy of the cooperating stations, the current position being a position when ToF is measured, and the processing circuitry is arranged to determine a location of the positioning station based on the current positions and ranges to the cooperating stations determined from the ToF positioning protocol.

In another example, the station is further arranged to: send a station cooperation table request message to the access point, the request message requesting the ToF cooperation table from the access point; and receive an access point cooperation table response message from the access point, the response message including the ToF cooperation table, and wherein during the ToF positioning protocol for each cooperating station, the positioning station is arranged to: send a station current position request message directly to a cooperating station requesting the current position of the cooperating station when the ToF is measured; and receive a station current position response message directly from the cooperating station, the response message including the current position of the cooperating station and the station-position accuracy for the current position.

In another example, a non-transitory computer-readable storage medium that stores instructions for execution by one or more processors of a wireless communication station is to perform operations as a positioning station for time-of-flight (ToF) positioning. The operations configure the station to: receive a ToF cooperation table from an access point, the ToF cooperation table identifying one or more cooperating stations and includes information about each cooperating station for ToF positioning; and perform a ToF positioning protocol with at least one of the cooperating stations identified in the ToF cooperation table using the information in the ToF cooperation table, wherein during the ToF positioning protocol the positioning station is arranged to: receive a current position and a station positional accuracy of the cooperating stations, the current position being a position when ToF is measured, and determine a location of the positioning station based on the current positions and ranges to the cooperating stations determined from the ToF positioning protocol.

In another example, the operations further configure the station to: send a station cooperation table request message to the access point, the request message requesting the ToF cooperation table from the access point; and receive an access point cooperation table response message from the access point, the response message including the ToF cooperation table, and wherein during the ToF positioning protocol for each cooperating station, the positioning station is arranged to: send a station current position request message directly to a cooperating station requesting the current position of the cooperating station when the ToF is measured; and receive a station current position response message directly from the cooperating station, the response message including the current position of the cooperating station and the station-position accuracy for the current position.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a positioning station for time-of-flight (ToF) positioning, the method comprising:
   receiving a ToF cooperation table from an access point, the ToF cooperation table identifying one or more cooperating stations and includes information about each cooperating station related to ToF positioning;
   selecting one or more cooperating stations from the table based on the information related to ToF positioning in the ToF cooperation table;
   performing a ToF positioning protocol with the selected cooperating stations using the information in the ToF cooperation table,
   wherein during the ToF positioning protocol, a current position and a station positional accuracy of the cooperating stations are received, the current position being a position when ToF is measured, the station positional accuracy being an accuracy associated with the current position received from an associated cooperation station; and
   determining a location of the positioning station based on the current positions and ranges to the cooperating stations determined during the ToF positioning protocol.

2. The method of claim 1 further comprising:
   sending a station cooperation table request message to the access point, the request message requesting the ToF cooperation table from the access point;
   receiving an access point cooperation table response message from the access point, the response message including the ToF cooperation table, and
   wherein during the ToF positioning protocol for each cooperating station, the method includes:
   sending a station current position request message directly to a cooperating station requesting the current position of the cooperating station when the ToF is measured; and
   receiving a station current position response message directly from the cooperating station, the response message including the current position of the cooperating station and the station-position accuracy for the current position.

3. The method of claim 2 wherein sending the station current position request message directly to the cooperating station and receiving the station current position response message directly from the cooperating station comprise using a direct-link setup (DLS) protocol or a tunneled DLS (TDLS) protocol.

4. The method of claim 1 further comprising:
   sending a neighbor report request message to the access point, the neighbor report request message requesting at least some information from a ToF cooperation table from the access point; and
   receiving a neighbor report response message from the access point, the neighbor report response message including at least some of the information of the ToF cooperation table, and
   wherein during the ToF positioning protocol for each cooperating station, the method includes:
   sending a location request message directly to the cooperating station requesting the current position of the cooperating station when the ToF is measured; and
   receiving a location response message directly from the cooperating station, the location response message including the current position of the cooperating station and the station-position accuracy for the current position.

5. The method of claim 2 wherein the information about each cooperating station included in the ToF cooperation table comprises at least a station frequency and a station address,
   wherein the positioning station is to use the station frequency and station address to send the station current position request message directly to the cooperating station.

6. The method of claim 5 wherein the information in the ToF cooperation table further includes, for each cooperating station, one or more of a station position, a station-position accuracy, a station position source, a time passed since a station position update, a distance between the cooperating station and the access point, and a station timing offset calibration accuracy.

7. The method of claim 6 further comprising selecting the cooperating stations identified in the ToF cooperation table to use for the ToF positioning protocol based on the information in the ToF cooperation table, wherein cooperating stations that are closer, have a greater positional accuracy and have less time passed since the station position update are selected over cooperating stations that are further away, have a lower positional accuracy and have greater time passed since the station position update.

8. The method of claim 1 further comprising sending a station ToF cooperation begin message to the access point indicating that the station will cooperate in ToF operations, the station ToF cooperation begin message including the information for ToF positioning.

9. The method of claim 1 wherein the ToF cooperation table is received from the access point in a beacon frame.

10. The method of claim 1 wherein performing the ToF positioning protocol includes exchanging action frames with time stamps and time-of-departure (TOD) information to determine the ranges to each of the cooperating stations.

11. The method of claim 1 wherein the cooperating stations identified in the ToF cooperation table are mobile stations having non-fixed locations, and
wherein the method further includes receiving a neighbor list from the access point, the neighbor list identifying one or more access points, the access points being stationary and having fixed locations, the neighbor list including information for ToF positioning including at least a position for each of the identified access points,
wherein for the access points identified in the neighbor list, the method includes:
performing a ToF positioning protocol with at least one of the access points using the information in the neighbor list to determine a range to each of the access points; and
refraining from requesting a position of the access points during the ToF positioning,
wherein the location of the positioning station is determined based on the current positions and the ranges to each of the cooperating stations and the positions and ranges to each of the access points determined from the ToF positioning protocols.

12. The method of claim 11 wherein receiving the neighbor list from the access point, the neighbor list identifying one or more access points comprises receiving a Neighbor Report Element that includes information for ToF positioning.

13. A wireless communication station arranged to operate as a positioning station for time-of-flight (ToF) positioning, the station arranged to:
receive a ToF cooperation table from an access point, the ToF cooperation table identifying one or more cooperating stations and includes information about each cooperating station related to ToF positioning;
select one or more cooperating stations from the table based on the information related to ToF positioning in the ToF cooperation table; and
perform a ToF positioning protocol with the selected cooperating stations using the information in the ToF cooperation table,
wherein during the ToF positioning protocol the positioning station is arranged to:
receive a current position and a station positional accuracy of the cooperating stations, the current position being a position when ToF is measured, the station positional accuracy being an accuracy associated with the current position received from an associated cooperation station, and
determine a location of the positioning station based on the current positions and ranges to the cooperating stations determined from the ToF positioning protocol.

14. The station of claim 13 further arranged to:
send a station cooperation table request message to the access point, the request message requesting the ToF cooperation table from the access point; and
receive an access point cooperation table response message from the access point, the response message including the ToF cooperation table, and
wherein during the ToF positioning protocol for each cooperating station, the positioning station is arranged to:
send a station current position request message directly to a cooperating station requesting the current position of the cooperating station when the ToF is measured; and
receive a station current position response message directly from the cooperating station, the response message including the current position of the cooperating station and the station-position accuracy for the current position.

15. The station of claim 14 wherein the information about each cooperating station included in the ToF cooperation table comprises at least a station frequency and a station address,
wherein the positioning station is to use the station frequency and station address to send the station current position request message directly to the cooperating station.

16. The station of claim 14 wherein the cooperating stations identified in the ToF cooperation table are mobile stations having non-fixed locations, and
wherein the positioning station is further arranged to:
receive a neighbor list from the access point, the neighbor list identifying one or more access points, the access points being stationary and having fixed locations, the neighbor list including information for ToF positioning including at least a position for each of the identified access points,
wherein for the access points identified in the neighbor list, the positioning station is further arranged to:
perform a ToF positioning protocol with at least one of the access points using the information in the neighbor list to determine a range to each of the access points; and
refrain from requesting a position of the access points during the ToF positioning,
wherein the location of the positioning station is determined based on the current positions and the ranges to each of the cooperating stations and the positions and ranges to each of the access points determined from the ToF positioning protocols.

17. A wireless communication station arranged to operate as a positioning station for time-of-flight (ToF) positioning, the station comprising:
one or more antennas;
physical layer circuitry coupled to the one or more antennas to receive a ToF cooperation table from an access point, the ToF cooperation table identifying one or more cooperating stations and includes information about each cooperating station related to ToF positioning; and
processing circuitry to:
select one or more cooperating stations from the table based on the information related to ToF positioning in the ToF cooperation table; and
perform a ToF positioning protocol with the selected cooperating stations using the information in the ToF cooperation table,
wherein during the ToF positioning protocol:
the physical layer circuitry is arranged to receive a current position and a station positional accuracy of the cooperating stations, the current position being a position when ToF is measured, the station positional accuracy being an accuracy associated with the current position received from an associated cooperation station, and the processing circuitry is arranged to determine a location of the positioning station based on the current positions and ranges to the cooperating stations determined from the ToF positioning protocol.

18. The station of claim 17 further arranged to:

send a station cooperation table request message to the access point, the request message requesting the ToF cooperation table from the access point; and receive an access point cooperation table response message from the access point, the response message including the ToF cooperation table, and wherein during the ToF positioning protocol for each cooperating station, the positioning station is arranged to:

send a station current position request message directly to a cooperating station requesting the current position of the cooperating station when the ToF is measured; and receive a station current position response message directly from the cooperating station, the response message including the current position of the cooperating station and the station-position accuracy for the current position.

19. A non-transitory computer-readable storage medium that stores instructions for execution by one or more processors of a wireless communication station to perform operations as a positioning station for time-of-flight (ToF) positioning, the operations to configure the station to:

receive a ToF cooperation table from an access point, the ToF cooperation table identifying one or more cooperating stations and includes information about each cooperating station related to ToF positioning;

select one or more cooperating stations from the table based on the information related to ToF positioning in the ToF cooperation table; and perform a ToF positioning protocol with the selected cooperating stations using the information in the ToF cooperation table, wherein during the ToF positioning protocol the positioning station is arranged to:

receive a current position and a station positional accuracy of the cooperating stations, the current position being a position when ToF is measured, the station positional accuracy being an accuracy associated with the current position received from an associated cooperation station, and determine a location of the positioning station based on the current positions and ranges to the cooperating stations determined from the ToF positioning protocol.

20. The non-transitory computer-readable storage medium of claim 19 wherein the operations further configure the station to:

send a station cooperation table request message to the access point, the request message requesting the ToF cooperation table from the access point; and receive an access point cooperation table response message from the access point, the response message including the ToF cooperation table, and wherein during the ToF positioning protocol for each cooperating station, the positioning station is arranged to:

send a station current position request message directly to a cooperating station requesting the current position of the cooperating station when the ToF is measured; and receive a station current position response message directly from the cooperating station, the response message including the current position of the cooperating station and the station-position accuracy for the current position.

* * * * *